A. BARBER.
Corn-Planter.
No. 61,701.
Patented Feb. 5, 1867.
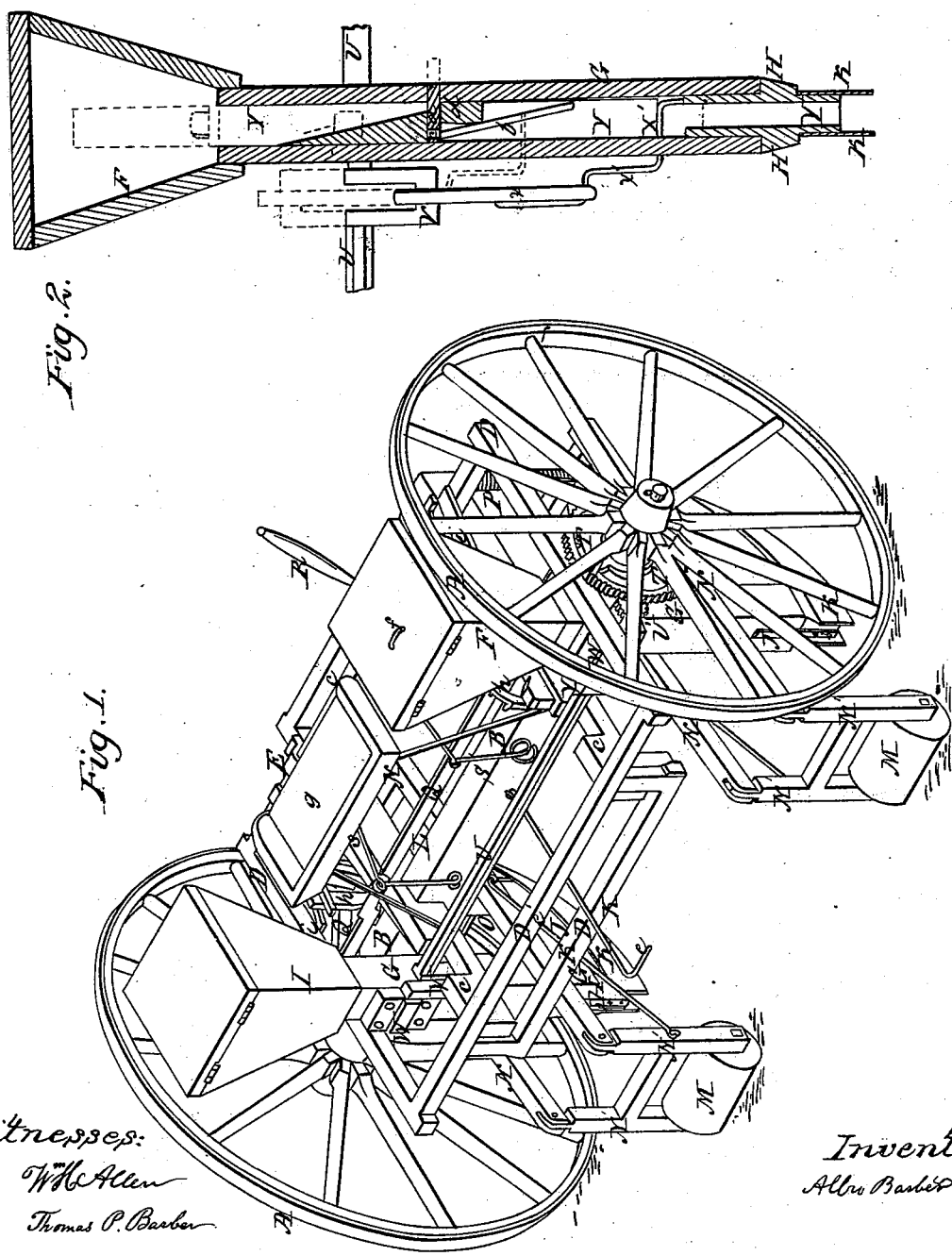
Witnesses:
W. H. Allen
Thomas P. Barber
Inventor
Albro Barber

United States Patent Office.

ALBRO BARBER, OF PORT BYRON, ILLINOIS.

Letters Patent No. 61,701, dated February 5, 1867.

---

IMPROVEMENT IN CORN PLANTERS.

---

*The Schedule referred to in these Letters Patent and making part of the same.*

---

TO ALL WHOM IT MAY CONCERN:

Be it known that I, ALBRO BARBER, of Port Byron, in the county of Rock Island, and State of Illinois, have invented certain new and useful Improvements in Corn Planters; and I do hereby declare the following to be a full, clear, and exact description of the nature, construction, and operation of the same, reference being had to the accompanying drawings, which are made part of this specification, and in which—

Figure 1 is a perspective view, from the rear of a corn planter, illustrating my invention.

Figure 2 is a vertical transverse section through one of the hoppers, and its discharge tube.

Similar letters of reference indicate corresponding parts in the two figures.

This invention relates to the class of corn planters which are drawn by a team, operated by a man or boy seated directly over the axle, plant two rows at the same time, and have the furrow openers elevated and lowered, and the operating mechanism thrown into and out of gear, by means of a lever.

The improvement consists in a novel construction of dropping mechanism, and means for throwing the same into and out of gear; also in means for elevating and lowering the markers or furrow openers and covering rollers.

In order that others skilled in the art to which my invention appertains may be enabled to fully understand and use the same, I will proceed to describe it in detail, in connection with the accompanying drawings.

A A may represent the wheels, and B the axle of the machine. C is a frame mounted upon the axle B, and secured in position so as to be immovable relatively to the latter. D is an adjustable frame, to which are attached the hoppers F F and discharge tubes G G, the latter being provided at their lower ends with markers or furrow openers K K. The front bar of the frame D is confined upon the side bars of frame C by the slotted pieces or bearings E; and within these bearings the front bar of frame D is free to turn, and it is also permitted to slide forward or backward therein. Hence it will be seen that the frame D may be moved forward or backward, and have its rear end elevated or lowered, which motions serve both to elevate or lower the furrow openers or markers K K and throw the pinion U' on the shaft U either into or out of gear with the cog-wheel T, which is attached to one of the carrying-wheels A. By thus throwing the pinion U' into and out of gear with the cog-wheel T the seed-dropping mechanism is put in operation, or has its operation suspended, as the case may be, as the dropping mechanism receives its motion from the said shaft U. Q is a rock-shaft, suitably mounted upon the frame C, and having attached to it a lever or handle, R, whereby the said shaft may be rocked in either direction. If rocked forward, the shaft Q throws the tappets or levers $h'$ $h'$ against the slotted arms $i$ $i$, and thereby moves the frame C forward far enough to place the pinion U' in gear with the cog-wheel T, so as to put the seed-dropping mechanism in operation. The forward rocking motion of the shaft Q also serves to withdraw the support of the arms Q' from the frame D, and the latter is thereby allowed to fall so as to lower the furrow openers K to their operating position. When the shaft Q is rocked backward by the lever R, the arms Q' Q' are brought forcibly upward against the side pieces of the frame D, and the rear end of the latter is thereby elevated so as to raise the furrow openers out of contact with the ground. This backward rocking motion of shaft Q also has the effect to move the levers $h'$ out of contact with the arms $i$, thus permitting the frame D to be retracted by the springs S' and rods S, said springs being attached to the axle B at both sides of the centre, and jointed to their rods S so as to freely conform to the forward adjustment of frame D. The frame D is retracted simultaneously with the elevation of the furrow openers, in order to throw the pinion U' out of gear with the driving cog T, and thereby suspend the operation of the seed-dropping mechanism. The lever R is detained in the desired position by the notches in the segment $h$. The shaft U is journalled in boxes W W, secured to the rear sides of the discharge spouts G G, and is formed with cranks V V, (see fig. 2,) which are attached to their respective slides Y by the arms X and bent rods X'. The slides Y move vertically within their respective discharge spouts G, and in each tube the slide Y operates in connection with a horizontal slide, $a$, to drop the grain at proper intervals. As the slide Y is raised, the slide $a$ is pushed outward by means of a pin attached to it, working in the oblique groove $b$ in the slide Y. When the slide Y reaches its utmost height the hole $c$ in the slide $a$ is filled with grain; and as the slide Y is lowered the slide $a$ is drawn in, the grain falls over the block $d$, and drops thence to the valve I, (fig. 1,) through which it is delivered to the ground by the descent of the slide Y. The inner faces of the valves I are bevelled, so as to adapt them to form a receptacle for the grain, and be readily opened or forced outward by the slides Y in their descent. J J are springs, which close the valves I when the slides ascend; and H H are iron pieces or guards attached to the lower ends of the tubes G G. $e$ is a hooked rod, which is connected to the axle by a staple, and which can be hooked into a staple (not shown) secured in the front side of the rear bar of frame D at the point $e'$, the rod $e$ being thus made to retain the frame D in an elevated position when the machine is being driven any distance without planting. $f$ is a bent rod, passing through the cover of hopper F, and standing over and in line with the slide Y, so that when depressed by hand the rod $f$ pushes down the slide Y, which is done in case the latter should become inoperative by binding. $g$ is the driver's seat, occupying a position above the axle, and supported by rods or arms attached to stationary frame C. M M are rollers, each journalled between the arms of a frame, $N'$, which is jointed to a frame, N, which is supported by a rod, O, the latter being fitted to turn in rigid arms depending from the axle. When the machine is in operation, the frames $N'$ are perpendicular to the frames N, as shown in the drawing; but when the machine is not in operation, but merely travelling from place to place, the frames N are turned up into a horizontal position, and thus retained by hooking the brace-rods $j$ into staples at $k\ k$, on the under side of the lower bar, at the rear of frame D. The rollers M M follow directly in the wake of the markers K K, and serve to cover the grain, break the clods, and flatten the furrows. The spiral springs P P are interposed between and joined to the frames N N and frame C, and exert an upward drawing action upon the forward ends of said frames N N, which has the effect to keep the rollers M M constantly pressing upon the ground.

Having thus described my invention, the following is what I claim as new herein, and desire to secure by Letters Patent:

1. I claim the frame D, having both a vertical and horizontal adjustment, for the purpose of controlling the operation of the seed-dropping mechanism and adjusting the vertical position of the furrow openers, substantially as described.

2. I claim the combination and arrangement of the movable frame D, stationary frame C, lever or handle R, arms $a'\ a'$, shaft Q, levers $h'$, slotted arms $i$, rods S, springs $S'$, and shaft U, as herein described and for the purpose specified.

3. I claim the crank-shaft U, arms X X, and connecting rods $X'\ X'$, in combination with the slides Y Y, $a\ a$, spring valves I I, J J, and discharge tubes G G, all arranged and operating in the manner and for the purpose set forth.

4. I claim the pivoted frames N $N'$, and rollers M, in combination with the springs P and rods $j$, all constructed and operating in the manner and for the purpose specified.

ALBRO BARBER.

Witnesses:
   WM. H. ALLEN,
   THOMAS P. BARBER.